Feb. 3, 1970 F. HOCK 3,493,775
OPTICAL SCANNING MEANS FOR USE IN PHOTOELECTRIC POSITIONING
DETERMINING APPARATUS
Filed April 11, 1966

INVENTOR
FROMUND HOCK.
BY
ATTORNEY

INVENTOR
FROMUND HOCK.
BY
ATTORNEY

United States Patent Office 3,493,775
Patented Feb. 3, 1970

3,493,775
OPTICAL SCANNING MEANS FOR USE IN PHOTOELECTRIC POSITIONING DETERMINING APPARATUS
Fromund Hock, Wetzlar, Germany, assignor to Fa. Ernst Leitz G.m.b.H.
Filed Apr. 11, 1966, Ser. No. 541,645
Claims priority, application Germany, Apr. 17, 1965, L 50,496
Int. Cl. H01j 39/12, 3/14, 5/16
U.S. Cl. 250—235
10 Claims

ABSTRACT OF THE DISCLOSURE

Apparatus for determining the position of a scale graduation or the like by oscillating an optical slit or an image of an optical slit parallel to itself along a path which includes the scale graduation or the like and photoelectrically determining the phase of the oscillation of the slit or image thereof at which the slit or image thereof passes over the graduation or the like. The diaphragm containing the slit and reflecting means for directing the beam of light passing through the slit are so mounted as to oscillate together. The output signal may be an indication of the phase of the oscillation of the slit or image thereof at which the slit or image thereof passes over the graduation or the like, or may be an indication of the amount by which it is necessary to displace the path of travel of the slit or image thereof to center the graduation or the like therein.

BACKGROUND OF THE INVENTION

The present invention relates to improvements in photoelectric systems for determining the position of scale graduations or the like with respect to the optical axis of the system by oscillating an optical slit or image thereof parallel to itself along a path containing the graduation or the like, photoelectrically sensing the location along said path at which the slit or image thereof passes the graduation or the like, and indicating either the position along said path at which said slit or image passes said graduation or the like (in which case said path is fixed in space with respect to said axis), or the amount by which said path must be displaced with respect to said axis to center said graduation or the like in said path. Examples of such systems are shown and described in my United States Patent No. 3,254,227. For convenience, all of such photoelectric systems, including those shown and described herein and those shown and described in my above-cited United States patent, may be termed "interpolating systems" herein, though it is to be understood that the present invention is not limited to devices for interpolating, or subdividing, between scale graduations, spectral lines, or the like.

More particularly, the present invention relates to improved scanning systems for scanning or oscillating an optical slit or image thereof along such a path.

In order to attain the advantages of small moving mass and high scanning frequency in photoelectric interpolating systems in which an optical slit or image thereof is oscillated parallel to itself along a path containing a scale graduation or the like, it is known in the prior art to place the driver means which causes the diaphragm containing the slit to oscillate in the plane of the diaphragm. It is also known that the plane of the lamp filament or other light source and the sensitive surface of the photocell or other photodetector should be positioned in such manner with respect to the slit diaphragm as to obtain as high light flux values on the photodetector as possible.

In accomplishing these desiderata according to the prior art, however, an undesirable modulation of the electrical signal emitted by the photodetector arises because of varying illumination of the slit at various positions in its path of travel due to variations in the flux density pattern of the light source, and because of variations in the active surface of the photodetector.

While this disturbing effect may be eliminated by providing homogeneous illumination through the use of well-known optical means, such a solution involves added expense and a considerable loss of light, which has a disadvantageous effect on the economic possibilities of application of instruments according to the prior art.

SUMMARY OF THE INVENTION

Accordingly, the objects of the present invention are:
To provide improved scanning means for use in photoelectric interpolating systems and the like, said improved scanning means comprising a combination of conjointly oscillated optical elements which successively affect light rays from a light source, causing said rays to scan a scale graduation or the like with substantially constant intensity throughout the scan.

To provide such an improved scanning means in which said conjointly oscillated optical elements comprise reflecting means and an optical slit in a diaphragm or the like; said reflecting means causing the principal or central rays from the light source to pass through said optical slit throughout all phases of the oscillation of said elements.

To provide such an improved scanning means wherein the reflecting means includes a mirror;

To provide such an improved scanning means wherein the reflecting means includes a prism;

To provide such an improved scanning means wherein said prism produces constant deflection of the light rays from said source, thus preventing translatory movement of the principal or central ones of said rays across said optical slit and across the active element of said photodetector.

BRIEF DESCRIPTION OF THE DRAWINGS

Other objects and many attendant advantages of the present invention will become apparent to those skilled in the art from consideration of the following description in conjunction with the attached drawings, in which like reference numerals denote the same or equivalent parts, and in which.

DESCRIPTION OF THE PREFERRED EMBODIMENTS

Figure 1:
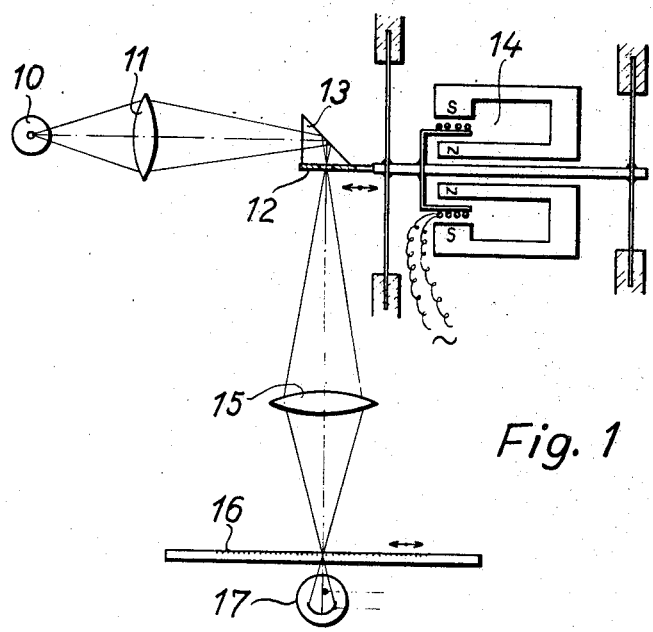
FIGURE 1 illustrates a device according to the present invention for deflecting light rays from a fixed source to pass through a moving optical slit so that the principal ones of said rays pass continually through said slit.

In the construction according to FIGURE 1, a lamp 10 illuminates an optical slit in a diaphragm 12 by way of a conductor lens 11. A deflecting prism 13 is interposed in the optical path between the diaphragm and the slit, and the prism and diaphragm are adapted to be jointly vibrated by means of a driver system 14 in a direction parallel to the illuminating ray generated by lamp 10.

The ray passing through the slit in diaphragm 12 is directed by way of objective 15 onto a marked glass scale 16 and scans the latter in a direction parallel to the illuminating ray. A photodetector 17 is located behind glass scale 16 and is part of a system (not shown) such as those described in my U.S. Patent No. 3,254,227 for the evaluation of light flux variations which occur during the scanning operation.

Figure 2:
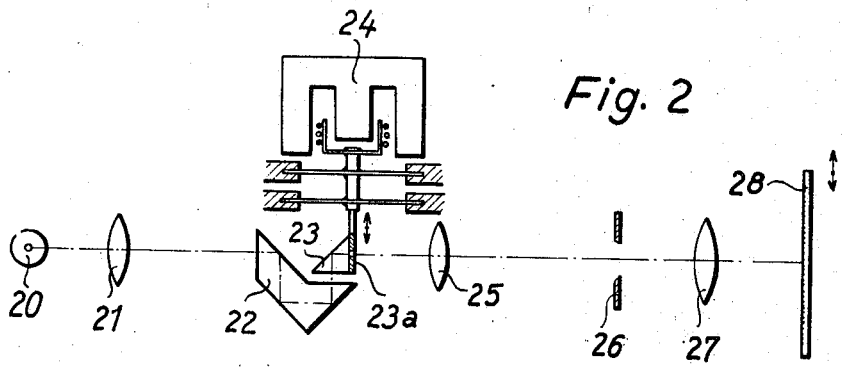
FIGURE 2 illustrates a device according to the present invention in which the initial and final light rays follow a common path.

FIGURE 2 shows another arrangement according to the present invention in which guidance of the light rays is achieved by means of additional ray deflections. In this arrangement the light of a lamp 20, after passing through a condenser lens 21, enters into a rigidly mounted thrice deflecting prism 22 which cooperates to guide the path of the light rays to a 90° deflecting prism 23. The outlet surface of this prism is provided with a slit diaphragm 23a. This prism is oscillated in a direction perpendicular to the light rays reflected by it by driver means including an annular air gap magnetic system 24, such as those described in my U.S. Patent No. 3,254,227. The scanning ray thereafter passes through further optical members 25, 26, 27 and impinges upon scale 28. The evaluation of the light impingent on scale 28 is carried out as described, for instance, in my above-cited United States patent. The arrangement as shown comprises a telecentric path of rays on both sides of the reproducing system 25, 26, 27.

Figure 3:
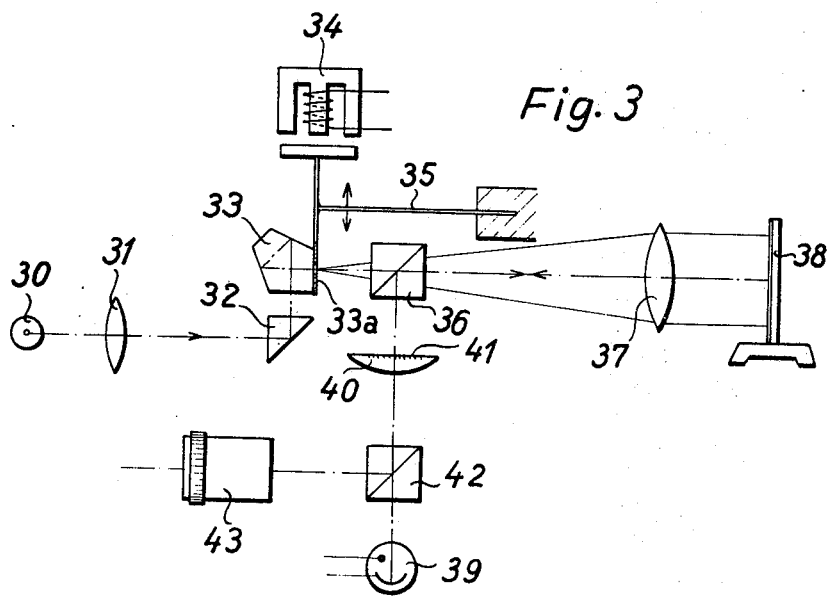
FIGURE 3 illustrates an auto-collimator embodying the invention.

FIGURE 3 shows an auto-collimator in which the concept forming the basis of the present invention has been realized. The light of a lamp 30 is passed by way of a condenser lens 31 to a rigidly mounted deflecting prism 32 adjacent which a movably positioned pentaprism 33 is located. The exit surface of prism 33 is provided with a slit diaphragm 33a. The prism 33 is guided by means of a spring 35 and is caused to vibrate by means of a magnetic driver system 34 which is supplied with alternating current. The reflected ray passes through a divider 36, thence through a telescopic objective 37 an then impinges in a manner known per se upon a base mirror 38, which mirror reflects the light rays back through the lens 37. The reflected rays are deflected at right angles by means of the divider surface of divider 36 toward a photodetector 39. Positioned intermediate receiver 39 and divider 36 is an index carrier 40 whose marks 41 have been defined with angle values. If the mirror 38 is not positioned precisely at right angles with respect to the axis of the scanning light ray, the reflected ray is correspondingly deflected on mark carrier 41 and, after the interposition of a divider 42, the deviation of the mirror 38 from the line perpendicular to the axis of the reflected ray may be read directly in angle values in the ocular 43. The structural elements 42, 43 can be omitted if the marks 41 are distinguished from each other, for example, by relative position coding, and the evaluation thereof is carried out by means of a corresponding number of photodetectors.

Figure 4:
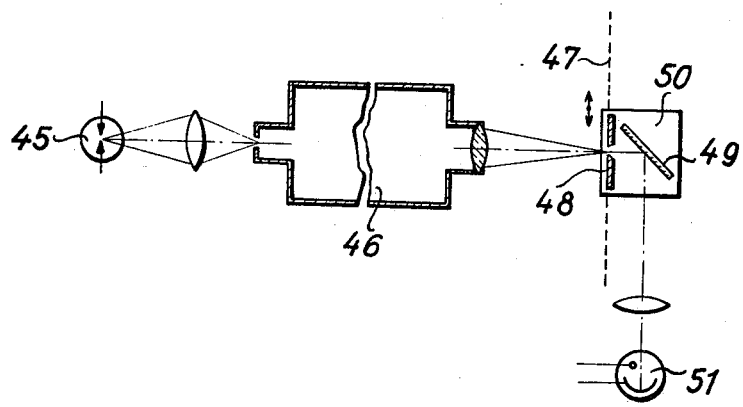
FIGURE 4 illustrates a spectral line scanner embodying the present invention.

FIGURE 4, in yet a further embodiment, discloses how the basic idea of the present invention may be advantageously employed to eliminate the undesirable effects of the light sensitivity being variable over the photodetector surface when measuring lines of a spectrum. The light of a source 45 to be analyzed is conveyed to a monochromator 46 which is only schematically illustrated herein. Positioned at the opposite end of monochromator 46 is a slit diaphragm 48 which is disposed in the plane 47 of the spectrum, and which together with a plane mirror 49 inclined about 45° to the diaphragm is secured to a carrier 50. This carrier is adapted to execute an oscillating movement parallel to the plane 47 by magnetic driver means such as those heretofore disclosed. This arrangement assures that the same spot of the receiving surface of the photo-electric receiver will be illuminated at all times during the scanning of the spectrum. Alteration of the measuring results by possible variations in the sensitivity of the receiving surface of the photodetector receiver is thereby prevented.

The prisms as illustrated herein may be easily made so small that their weight does not negatively influence the oscillations effected by means of the driver systems.

While several preferred embodiments of the present invention have been particularly shown and described, it will be apparent to those skilled in the art that alternate embodiments and/or modifications may be made within the spirit and scope of the invention, and it is desired, therefore, that only such limitations be placed on the invention as are imposed by the prior art and set forth in the appended claims.

I claim:
1. Scanning means for use in photoelectric position determining apparatus, comprising: means for generating a beam of light rays; diaphragm means with a scanning aperture; means for reflecting said beam of light rays by 90°; and means for vibrating said reflecting means concomitantly with said diaphragm means in a direction which subtends an angle of 45° with the line bisecting the angle between the initial and final paths of the light rays deflected by said reflecting means.

2. A device according to claim 1 in which said reflecting means comprises a mirror.

3. A device according to claim 2 comprising electromechanical transducer means for driving said mirror.

4. A device according to claim 1 in which said reflecting means comprises a prism.

5. A device according to claim 4 comprising electromechanical transducer means for driving said prism.

6. A device according to claim 1 in which said reflecting means is mounted in the path of the light rays before said diaphragm means.

7. A device according to claim 1 in which said reflecting means is mounted in the path of the light rays behind said diaphragm means.

8. A device according to claim 1 in which said vibrating means comprises a member supporting said reflecting means and said diaphragm means, and an alternating current source, said supporting member being driven by magnetic means supplied with alternating current.

9. A device according to claim 8 in which said supporting member is guided by spring means secured to at least one stationary point.

10. A scanning means for use in a photoelectric position determining apparatus as claimed in claim 1, further comprising a first focusing means mounted in the path of said beam of light rays between said means for generating and said reflecting means; said means for reflecting being mounted fixedly adjacent said diaphragm means; a scale means, said scale means mounted spaced from and in parallel with said diaphragm; said scale means provided on the light rays receiving side with transparent graduation marks; means to reciprocate said scale means; a second focusing means mounted in the path of said beam of light rays in optical axial alignment and spaced from and between said diaphragm means and light rays receiving side of said scale means; and an electro-optical receiver mounted on the side of said scale means opposite from said light rays receiving side in axial alignment with the axis of said second focussing means.

References Cited
UNITED STATES PATENTS

| 2,478,555 | 8/1949 | Yule | 88—24 |
| 2,506,764 | 5/1950 | Bach | 88—1.5 |
| 3,369,444 | 2/1968 | Patrignani | 88—14 |

RONALD L. WIBERT, Primary Examiner

J. ROTHENBERG, Assistant Examiner

U.S. Cl. X.R.

356—167, 170